(12) United States Patent
Xie

(10) Patent No.: US 11,691,596 B2
(45) Date of Patent: Jul. 4, 2023

(54) SMART WELCOME SYSTEM OF VEHICLE AND CONTROLLING METHOD THEREOF

(71) Applicants: Hyundai Motor Company, Seoul (KR); Kia Corporation, Seoul (KR)

(72) Inventor: Hui Xie, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 64 days.

(21) Appl. No.: 17/546,276

(22) Filed: Dec. 9, 2021

(65) Prior Publication Data

US 2023/0066551 A1 Mar. 2, 2023

(30) Foreign Application Priority Data

Aug. 27, 2021 (CN) .......................... 202110994177.8

(51) Int. Cl.
*B60R 25/24* (2013.01)
*G07C 9/00* (2020.01)
*B60Q 5/00* (2006.01)
*B60R 1/12* (2006.01)
*B60R 1/074* (2006.01)

(52) U.S. Cl.
CPC ............ *B60R 25/245* (2013.01); *B60Q 5/005* (2013.01); *B60R 1/074* (2013.01); *B60R 1/12* (2013.01); *G07C 9/00309* (2013.01); *B60R 2001/1276* (2013.01); *G07C 2009/00769* (2013.01); *G07C 2009/00984* (2013.01); *G07C 2209/63* (2013.01)

(58) Field of Classification Search
None
See application file for complete search history.

(56) References Cited

U.S. PATENT DOCUMENTS 9,858,735 B2 * 1/2018 Spahl ...................... H04W 4/80

* cited by examiner

*Primary Examiner* — K. Wong
(74) *Attorney, Agent, or Firm* — Slater Matsil, LLP

(57) ABSTRACT

A control method of a smart welcome system of a vehicle includes emitting a low-frequency signal of a first power to search for a smart key in a first search area, emitting a high-frequency signal by the smart key, determining that the smart key is within the first search area, carrying out authentication for the smart key, transmitting a wake-up signal to an AVNT smart connection device, and emitting a low-frequency signal of a second power to search for the smart key in a second search area, executing a booting program, transmitting a high-frequency signal by the authenticated smart key, determining that the authenticated smart key is within the second search area, unfolding a side mirror and outputting a welcome sound output signal to a welcome speaker, and outputting a welcome sound simultaneously with unfolding the side mirror.

20 Claims, 3 Drawing Sheets

SMART WELCOME SYSTEM OF VEHICLE AND CONTROLLING METHOD THEREOF

CROSS-REFERENCE TO RELATED APPLICATIONS

This application claims the benefit of Chinese Patent Application No. 202110994177.8, filed in the Chinese National Intellectual Property Administration on Aug. 27, 2021, which application is hereby incorporated herein by reference.

TECHNICAL FIELD

The present disclosure relates to a smart welcome system of a vehicle and a control method thereof.

BACKGROUND

With the development of vehicle smartization, a keyless entry and welcome function of the vehicle, which mainly emphasizes smartized human-vehicle interaction experience, has already been developed. When a vehicle owner approaches the vehicle with a portable smart key, the vehicle "senses" the vehicle owner's approach through sensing the smart key, and through the control element, automatically operates a light system such as a vehicle's side mirror welcome light, a door handle welcome light, a head light, or a tail light, unfolds a folded side mirror, adjusts a seating position of the seat, broadcasts a smart welcome sound, and creates a welcome atmosphere, to thereby improve convenience in use of the vehicle and simultaneously make the vehicle owner feel honored.

Currently, when the vehicle uses the smart welcome function, a certain operation time is required for an audio video navigation telecommunication (AVNT) smart connection device of the vehicle to operate from a sleeping state, and thus the unfolding of the side mirror and the smart welcome sound are not synchronized, and this greatly affects the user experience.

Therefore, a control method that synchronizes the unfolding of the side mirror of the smart welcome system and the smart welcome sound is required.

The above-mentioned background technology is merely a description of a technical solution of embodiments of the present invention (the technical means used, the solved technical problem, and the technical effect that has occurred) in a more in-depth understanding, and the description is of a person of ordinary skill in the art and it should not be construed as acknowledging or implying in any form that it is conventional art already known to the public.

The above information disclosed in this Background section is only for enhancement of understanding of the background of the invention, and therefore it may contain information that does not form the prior art that is already known to a person of ordinary skill in the art.

SUMMARY

For the defects existing in the conventional art, embodiments of the present invention provide a smart welcome system of a vehicle and a control method thereof to allow the vehicle to detect the smart key early by increasing a search distance between a smart key and a low-frequency antenna installed on a door handle, and an AVNT smart connection device is woken up early and synchronizes unfolding of a side mirror and outputting of a smart welcome sound.

An embodiment of the present invention provides a control method of a smart welcome system of a vehicle including controlling a low-frequency antenna to emit a low-frequency signal of a first power by a vehicle body control device to search for a smart key in a first search area when the vehicle is in a locked state, when the smart key receives the low-frequency signal of the first power from the low-frequency antenna, emitting a high-frequency signal to the vehicle body control device by the smart key, when the vehicle body control device initially receives the high-frequency signal from the smart key, determining that the smart key is within a first search area, carrying out authentication for the smart key, transmitting a wake-up signal to an AVNT smart connection device, and emitting a low-frequency signal of a second power to search for the smart key in a second search area by controlling the low-frequency antenna, when the AVNT smart connection device receives the wake-up signal from the vehicle body control device, executing a booting program by the AVNT smart connection device, when the smart key that has been authenticated receives the low-frequency signal of the second power, transmitting a high-frequency signal to the vehicle body control device by the authenticated smart key, when the vehicle body control device receives the high-frequency signal again from the authenticated smart key, determining that the authenticated smart key is within the second search area, unfolding a side mirror and outputting a welcome sound output signal to a welcome speaker through the AVNT smart connection device, and when the welcome speaker receives the welcome sound output signal from the AVNT smart connection device, outputting the welcome sound simultaneously with the unfolding of the side mirror.

Preferably, the first search area is an area where a distance between the low-frequency antenna and the smart key is less than or equal to 3 m, the second search area is an area where the distance between the low-frequency antenna and the smart key is less than or equal to 1.5 m, the low-frequency signal of the first power covers the first search area, and the low-frequency signal of the second power covers the second search area.

Preferably, the low-frequency signal includes a signal of 125 KHz, and the high-frequency signal includes a signal of 433.92 MHz.

Preferably, the vehicle body control device stores authentication information of the smart key in advance in a learning manner and proceeds with authentication for the smart key.

Preferably, the low-frequency antenna is installed in a door handle portion at a driver's side, and the welcome speaker is installed in a side mirror portion of the driver's side.

An embodiment of the present invention provides a smart welcome system of a vehicle including a low-frequency antenna, a smart key, a vehicle body control device, an AVNT smart connection device, and a welcome speaker, wherein when the vehicle is in a locked state, the low-frequency antenna emits a low-frequency signal of a first power to search for a smart key in a first search area, and emits a low-frequency signal of a second power to search for the smart key in a second search area, the smart key emits a high-frequency signal to the vehicle body control device when receiving the low-frequency signal of the first power or the low-frequency signal of the second power from the low-frequency antenna, the vehicle body control device determines that the smart key is in the first search area when initially receiving the high-frequency signal from the smart key, proceeds with authentication for the smart key, emits a wake-up signal to the AVNT smart connection device, and controls the low-frequency antenna to emit the low-frequency signal of the second power, when receiving the high-frequency signal again from the authenticated smart key, the vehicle body control device determines that the authenticated smart key is in the second search area, unfolds a side mirror, and emits a welcome sound output signal to the welcome speaker through the AVNT smart connection device, when receiving the wake-up signal from the vehicle body control device, the AVNT smart connection device executes a booting program, and the welcome speaker is electrically connected with the AVNT smart connection device, and when receiving the welcome sound output signal from the AVNT smart connection device, the welcome speaker outputs the welcome sound simultaneously with the unfolding of the side mirror.

Preferably, the first search area is an area where a distance between the low-frequency antenna and the smart key is less than or equal to 3 m, the second search area is an area where the distance between the low-frequency antenna and the smart key is less than or equal to 1.5 m, the low-frequency signal of the first power covers the first search area, and the low-frequency signal of the second power covers the second search area.

Preferably, the low-frequency signal includes a signal of 125 KHz, and the high-frequency signal includes a signal of 433.92 MHz.

Preferably, the vehicle body control device stores authentication information of the smart key in advance in a learning manner and proceeds with authentication for the smart key.

Preferably, the low-frequency antenna is installed in a door handle portion at a driver's side, and the welcome speaker is installed in a side mirror portion of the driver's side.

Since embodiments of the present invention may employ the above technical solutions, they may have the following beneficial effects.

The smart welcome system of the vehicle and the control method thereof according to the embodiments of the present invention set a plurality of search areas between the smart key and the low-frequency antenna by using a plurality of low-frequency signals of different emission powers of the low-frequency antenna, and thus the vehicle can search for the smart key within different search areas, and wake up the AVNT smart connection device early to synchronize unfolding of the side mirror and outputting of the smart welcome sound, thereby significantly improving the user's vehicle experience.

BRIEF DESCRIPTION OF THE DRAWINGS

Hereinafter, embodiments of the present invention will be described in more detail with the accompanying drawings. For clarity, the same member in different drawings is indicated by the same symbol. The drawings are merely exemplary and are not necessarily drawn to scale.

DETAILED DESCRIPTION OF ILLUSTRATIVE EMBODIMENTS

Hereinafter, embodiments of the present invention will be described in detail, and the embodiments are carried out on the premise of the technical solution of embodiments of the present invention, and the detailed implementation method and specific operation process are presented, but the protection range of the present invention is not limited to the embodiments described hereinbelow.

Figure 1:
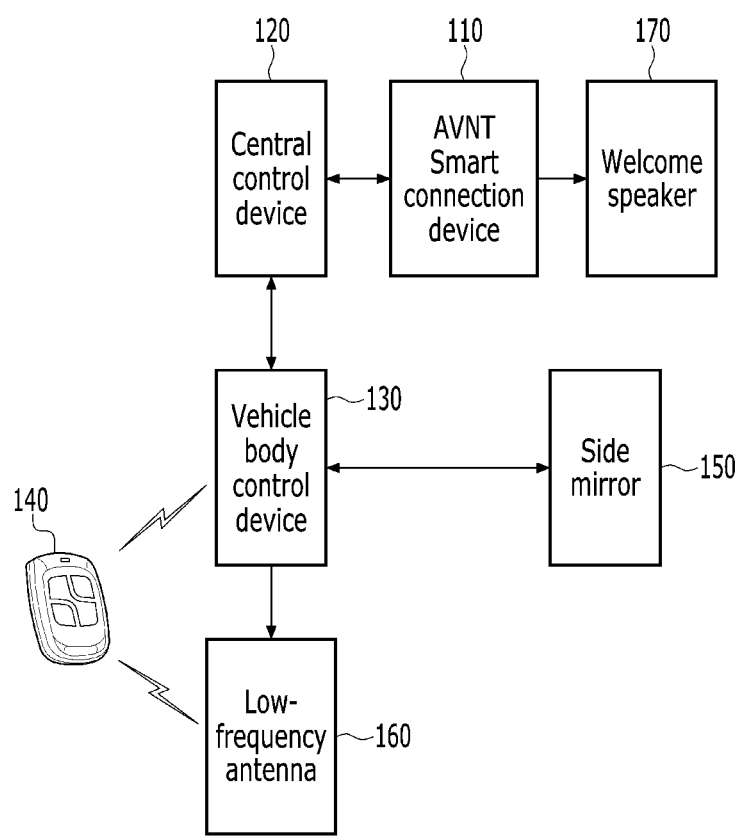
FIG. 1 is a block diagram of a smart welcome system of a vehicle according to an embodiment of the present invention.

FIG. 1 is a block diagram of a smart welcome system of a vehicle according to an embodiment of the present invention.

As shown in FIG. 1, a smart welcome system of the vehicle according to the embodiment of the present invention includes an audio video navigation telecommunication (AVNT) smart connection device no, a central control device 120, a vehicle body control device 130, a smart key 140, a side mirror 150, a low-frequency antenna 160, and a welcome speaker 170.

The AVNT smart connection device no is electrically connected with the central control device 120 and thus can communicate with the central control device 120 through a MM_CAN bus and the central control device 120 is electrically connected to the vehicle body control device 130 and may communicate with the vehicle body control device 130 through a B_CAN bus, but a communication method of the present invention is not limited to the above-stated communication method.

The smart key 140 may perform wireless communication with the low-frequency antenna 160 through a low-frequency signal. That is, the smart key 140 may receive a low-frequency signal from the low-frequency antenna 160, and the low-frequency signal may include a signal of 125 KHz, but the present invention is not limited thereto.

In addition, the smart key 140 may perform wireless communication with the vehicle body control device 130 through a high-frequency signal. That is, the smart key 140 may transmit a high-frequency signal to the vehicle body control device 130. In embodiments of the present invention, when the smart key 140 receives a low-frequency signal from the low-frequency antenna 160, the smart key 140 may transmit a high-frequency signal to the vehicle body control device 130. The high-frequency signal may include a 433.92 MHz signal, but the present invention is not limited thereto.

The low-frequency antenna 160 may be installed on a door handle on the driver side. When the vehicle is in a locked state, the low-frequency antenna 160 may emit a low-frequency signal of a first power to search for the smart key 140 within a first search area, and may emit a low-frequency signal of a second power to search for the smart key 140 within a second search area. In an implementation method of an embodiment of the present invention, after the vehicle is locked, the search for the smart key may be performed within a specific search period (e.g., within a period of 7 days or within another predetermined period). That is, when a specific search period is exceeded, no more searches are made for the smart key.

In the implementation method of an embodiment of the present invention, the first search area may be an area where a distance between the low-frequency antenna and the smart key is less than or equal to 3 m, and the second search area may be an area where a distance between the low-frequency antenna and the smart key is less than or equal to 1.5 m. That is, the low-frequency signal of the first power emitted by the low-frequency antenna may cover the first search area, and the low-frequency signal of the second power emitted by the low-frequency antenna may cover the second search area. Here, the ranges of the first search area and the second search area are merely examples, and different search areas can be determined by setting low-frequency signals of different emission powers of the low-frequency antenna, and the present invention is not limited to the range of the search area described in the text and is not limited to the number of search areas described in the text.

The welcome speaker 170 is installed in a side mirror portion of the driver's side and thus may be electrically connected with the AVNT smart connection device no, and when the welcome speaker 170 receives a welcome sound output signal from the AVNT smart connection device no, the welcome speaker 170 outputs a welcome sound while the side mirror is unfolded at the same time.

The vehicle body control device 130 performs wireless communication with the smart key 140 through a high-frequency signal. That is, the vehicle body control device 130 may receive a high-frequency signal from the smart key 140. The vehicle body control device 130 may control the low-frequency antenna 160 to emit a low-frequency signal of the first power or a low-frequency signal of the second power.

When the vehicle is in the locked state, the vehicle body control device 130 controls the low-frequency antenna 160 to emit the low-frequency signal of the first power. When the vehicle body control device 130 receives the high-frequency signal from the smart key 140 for the first time, the vehicle body control device 130 determines that the smart key 140 is in the first search area and proceeds with authentication for the smart key 140 such that the AVNT smart connection device no can execute a booting program and control the low-frequency antenna 160 to emit a low-frequency signal of the second power. When the vehicle body control device 130 receives the high-frequency signal again from the smart key 140 that has been authenticated, it is determined that the smart key 140 is within the second search area, and thus the side mirror 150 is unfolded and a welcome sound output signal is transmitted to the welcome speaker 170 through the AVNT smart connection device no.

In the embodiment of the present invention, the vehicle body control device 130 stores the authentication information of the smart key 140 in advance in a learning manner. Here, since the authentication process related to the smart key is a known technology in the relevant field, it will not be described in detail in the text.

The welcome speaker 170 may be installed on the side mirror of the driver, but is not limited thereto, and may output a welcome sound. The welcome speaker 170 may be electrically connected to the AVNT smart connection device no, and when receiving the welcome sound output signal from the AVNT smart connection device no, the side mirror is unfolded and at the same time the welcome sound is output.

According to the embodiment of the present invention, the smart welcome system of the vehicle side mirror is unfolded, and simultaneously, light systems such as a vehicle's side mirror welcome light, a door handle welcome light, a head light, and a tail light may be automatically operated, and thus will not be described in detail any further.

According to the embodiment of the present invention, the smart welcome system sets a plurality of search areas between the smart key and the low-frequency antenna by using a plurality of low-frequency signals of different emission powers of the low-frequency antenna, and thus the vehicle can search for the smart key within different search areas, and can wake up the AVNT smart connection device early to synchronize unfolding of the side mirror and outputting of the smart welcome sound, thereby significantly improving the user's vehicle experience.

Figure 2:
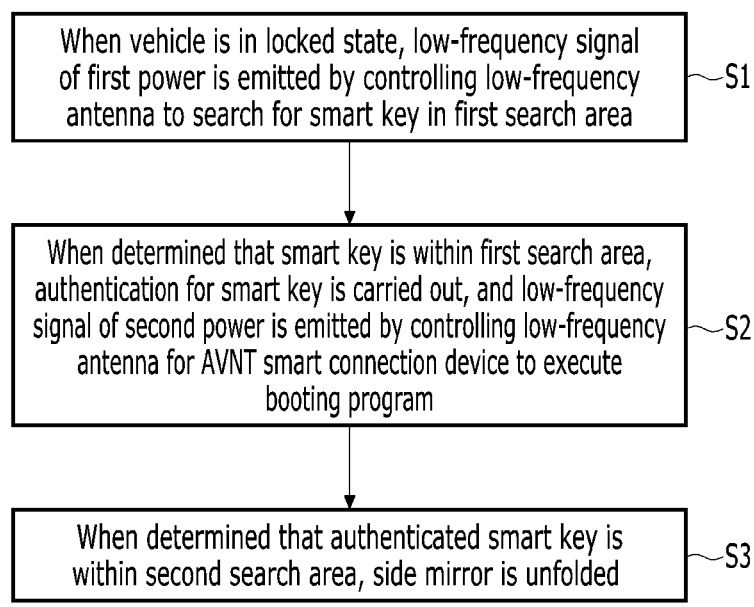
FIG. 2 is a block diagram of a control method of the smart welcome system of the vehicle according to an embodiment of the present invention.

FIG. 2 is a block diagram of a control method of the smart welcome system of the vehicle according to an embodiment of the present invention. As shown in FIG. 2, a control method of the smart welcome system of the vehicle according to the embodiment of the present invention includes the following steps.

In S1, when the vehicle is in the locked state, a vehicle body control device controls a low-frequency antenna to emit a low-frequency signal of the first power to search for a smart key in the first search area.

In S2, when determining that the smart key is included in the first search area, the vehicle body control device proceeds with authentication for the smart key such that the AVNT smart connection device executes a booting program and controls the low-frequency antenna to emit a low-frequency signal of the second power.

In S3, when determining that the authenticated smart key is within the second search area, the vehicle body control device outputs a welcome sound simultaneously when the side mirror is unfolded.

Figure 3:
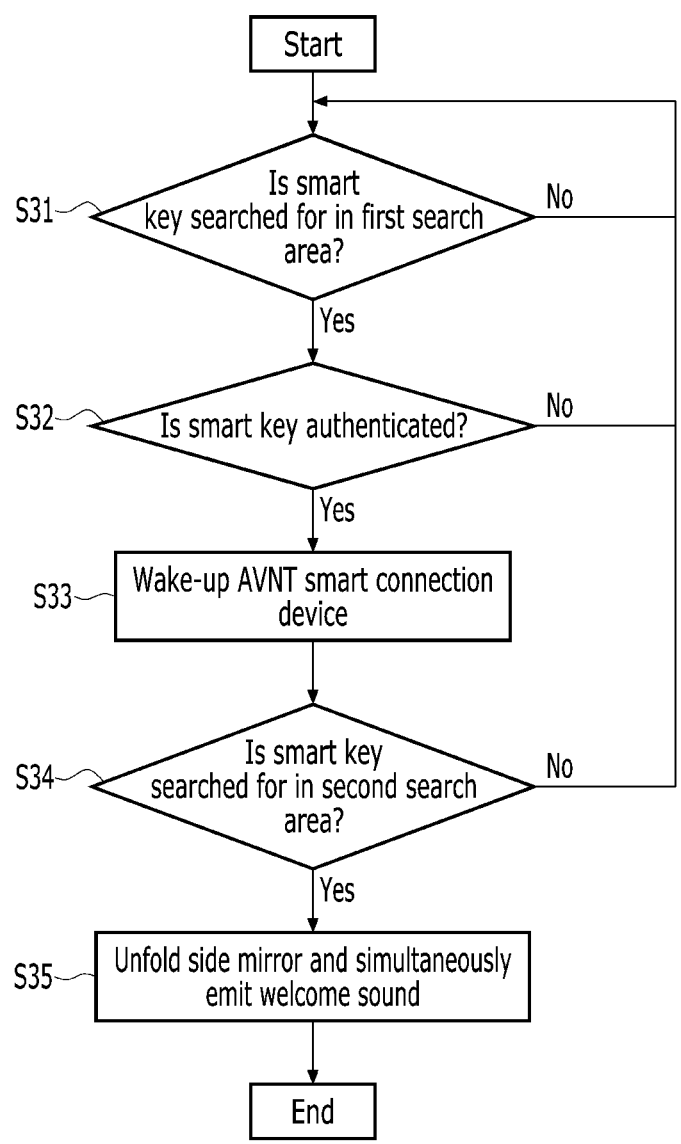
FIG. 3 is a flowchart of the control method of the smart welcome system of the vehicle according to an embodiment of the present invention.

FIG. 3 is a flowchart of the control method of the smart welcome system of the vehicle according to an embodiment of the present invention.

Referring to FIG. 3, in S31, when the vehicle is in the locked state, the vehicle body control device controls a low-frequency antenna to emit a low-frequency signal of the first power to search for a smart key in the first search area.

In S32, when the smart key receives the low-frequency signal of the first power from the low-frequency antenna, the smart key transmits a high-frequency signal to the vehicle body control device, and when the vehicle body control device initially receives the high-frequency signal from the smart key, the vehicle body control device determines that the smart key is in the first search area, and it proceeds with authentication for the smart key. In the embodiment of the present invention, the vehicle body control device 130 stores the authentication information of the smart key 140 in advance in a learning manner. Here, since the authentication process related to the smart key is a known technology in the relevant field, it will not be described in detail.

In S33, a wake-up signal is transmitted to the AVNT smart connection device, and when the AVNT smart connection device receives the wake-up signal from the vehicle body control device, the AVNT smart connection device is woken up and executes a booting program.

In S34, the vehicle body control device may control a low-frequency antenna to emit a low-frequency signal of the second power to search for a smart key within the second search area.

According to the embodiment of the present invention, the first search area may be an area where a distance between the low-frequency antenna and the smart key is less than or equal to 3 m, and the second search area may be an area where the distance between the low-frequency antenna and the smart key is less than or equal to 1.5 m. That is, the low-frequency signal of the first power emitted by the low-frequency antenna may cover the first search area, and the low-frequency signal of the second power emitted by the low-frequency antenna may cover the second search area. Here, the ranges of the first search area and the second search area are merely examples, and different search areas can be determined by setting low-frequency signals of different emission powers of the low-frequency antenna, and the present invention is not limited to the range of the search area described in the text and is not limited to the number of search areas described in the text.

When the smart key receives the low-frequency signal of the second power from the low-frequency antenna, in S35, the smart key transmits the high-frequency signal to the vehicle body control device, and when receiving the high-frequency signal again from the smart key that has been authenticated, the vehicle body control device determines that the smart key is within the second search area, and unfolds the side mirror and transmits a welcome sound output signal to the welcome speaker, and when the welcome speaker receives the welcome sound output signal from the AVNT smart connection device, the side mirror is unfolded and at the same time the welcome sound is output.

That is, when it is detected that the smart key enters the second search area from the first search area, the ANVT smart connection device wakes up and executes the booting program, thereby ensuring that the side mirror is unfolded and simultaneously the welcome sound is output.

Therefore, in, the control method of the smart welcome system of the vehicle according to the embodiment of the present invention, through searching for the smart key within different search areas, the vehicle wakes up the AVNT smart connection device early, and when the smart key is detected again, the unfolding of the side mirror and the smart welcome sound are synchronized to significantly improve the user's vehicle use experience.

Hereinafter, an operation process of the control method of the smart welcome system of the vehicle according to an embodiment of the present invention will be described through a detailed embodiment.

When the vehicle is in the locked state, when the user (carrying a smart key) approaches the vehicle and reaches the first search area, the smart key receives the low-frequency signal of the first power from the low-frequency antenna, and the vehicle body control device may transmit a high-frequency signal. In this case, when the vehicle body control device receives the high-frequency signal from the smart key for the first time, it is determined that the smart key is in the first search area, and the smart key is authenticated and a wake-up signal is transmitted to the AVNT smart connection device such that the AVNT smart connection device wakes up and executes the booting program, and the low-frequency antenna is controlled to search for the smart key within the second search area by emitting a low-frequency signal of the second power.

When the user reaches the second search area as the user gradually approaches the vehicle, the smart key receives the second power low-frequency signal from the low-frequency antenna and transmits a high-frequency signal to the vehicle body control device. In this case, when the vehicle body control device receives a high-frequency signal from the certified smart key again, the vehicle body control device determines that the smart key is within the second search area, and the side mirror is unfolded and simultaneously the welcome sound is output.

Thus, the smart welcome system of the vehicle and the control method thereof according to the embodiment of the present invention sets a plurality of different search areas between the smart key and the low-frequency antenna by using a plurality of low-frequency signals of different emission powers of the low-frequency antenna and thus the vehicle can search for the smart key in different search areas such that the AVNT smart connection device can wake up early and unfolding of the side mirror and outputting of the smart welcome sound can be synchronized, thereby significantly improving the user's vehicle use experience.

The various embodiments of the present invention do not list all possible combinations, but are intended to describe representative aspects of the present invention, and the contents described in various embodiments can be applied independently or in a combination of two or more.

The description made in the above embodiments is for description of the technical solution of embodiments of the present invention, and is not intended to be a complete description, and is not intended to limit the present invention to the precise form as described. It is possible for a person of an ordinary skill in the art to undergo various modifications and changes according to the above teachings. The exemplary implementations are selected and described to interpret the specific principles of the present invention and its practical application, and thus various exemplary implementations of the present invention and various selection forms and modifications can be easily understood, realized, and used by a person of ordinary skill in the art. The protection scope of the present invention is limited by the claims range and its equivalents.

What is claimed is:

1. A control method of a smart welcome system of a vehicle, the method comprising:
   controlling a low-frequency antenna to emit a low-frequency signal of a first power by a vehicle body control device to search for a smart key in a first search area when the vehicle is in a locked state;
   in response to the smart key receiving the low-frequency signal of the first power from the low-frequency antenna, emitting a high-frequency signal to the vehicle body control device by the smart key;
   in response to the vehicle body control device first receiving the high-frequency signal from the smart key, determining that the smart key is within the first search area, carrying out authentication for the smart key, transmitting a wake-up signal to an audio video navigation telecommunication (AVNT) smart connection device, and emitting a low-frequency signal of a second power to search for the smart key in a second search area by controlling the low-frequency antenna;
   in response to the AVNT smart connection device receiving the wake-up signal from the vehicle body control device, executing a booting program by the AVNT smart connection device;
   in response to the smart key that has been authenticated receiving the low-frequency signal of the second power, transmitting a high-frequency signal to the vehicle body control device by the authenticated smart key;
   in response to the vehicle body control device again receiving the high-frequency signal from the authenticated smart key, determining that the authenticated smart key is within the second search area, unfolding a side mirror and outputting a welcome sound output signal to a welcome speaker through the AVNT smart connection device; and
   in response to the welcome speaker receiving the welcome sound output signal from the AVNT smart connection device, outputting a welcome sound simultaneously with unfolding the side mirror.

2. The method of claim 1, wherein:
   the first search area is an area where a distance between the low-frequency antenna and the smart key is less than or equal to 3 m; and
   the second search area is an area where the distance between the low-frequency antenna and the smart key is less than or equal to 1.5 m.

3. The method of claim 2, wherein:
   the low-frequency signal of the first power covers the first search area; and
   the low-frequency signal of the second power covers the second search area.

4. The method of claim 3, wherein:
the low-frequency signal comprises a signal of 125 KHz; and
the high-frequency signal comprises a signal of 433.92 MHz.

5. The method of claim 1, wherein:
the low-frequency signal comprises a signal of 125 KHz; and
the high-frequency signal comprises a signal of 433.92 MHz.

6. The method of claim 1, further comprising:
storing authentication information of the smart key in advance in a learning manner; and
proceeding with authentication for the smart key.

7. The method of claim 1, wherein:
the low-frequency antenna is installed in a door handle portion at a driver's side of the vehicle; and
the welcome speaker is installed in a side mirror portion at the driver's side of the vehicle.

8. A smart welcome system of a vehicle, the system comprising:
a low-frequency antenna;
a smart key;
a vehicle body control device;
an AVNT smart connection device; and
a welcome speaker electrically connected with the AVNT smart connection device;
wherein when the vehicle is in a locked state, the low-frequency antenna is configured to emit a low-frequency signal of a first power to search for the smart key in a first search area, and to emit a low-frequency signal of a second power to search for the smart key in a second search area;
wherein the smart key is configured to emit a high-frequency signal to the vehicle body control device in response to receiving the low-frequency signal of the first power or the low-frequency signal of the second power from the low-frequency antenna;
wherein the vehicle body control device is configured to determine that the smart key is in the first search area in response to first receiving the high-frequency signal from the smart key, to proceed with authentication for the smart key, to emit a wake-up signal to the AVNT smart connection device, and to control the low-frequency antenna to emit the low-frequency signal of the second power;
wherein in response to again receiving the high-frequency signal from the authenticated smart key, the vehicle body control device is configured to determine that the authenticated smart key is in the second search area, to unfold a side mirror, and to emit a welcome sound output signal to the welcome speaker through the AVNT smart connection device;
wherein in response to receiving the wake-up signal from the vehicle body control device, the AVNT smart connection device is configured to execute a booting program; and
wherein in response to receiving the welcome sound output signal from the AVNT smart connection device, the welcome speaker is configured to output a welcome sound simultaneously with unfolding the side mirror by the vehicle body control device.

9. The system of claim 8, wherein:
the first search area is an area where a distance between the low-frequency antenna and the smart key is less than or equal to 3 m; and
the second search area is an area where the distance between the low-frequency antenna and the smart key is less than or equal to 1.5 m.

10. The system of claim 9, wherein:
the low-frequency signal of the first power covers the first search area; and
the low-frequency signal of the second power covers the second search area.

11. The system of claim 10, wherein:
the low-frequency signal comprises a signal of 125 KHz; and
the high-frequency signal comprises a signal of 433.92 MHz.

12. The system of claim 8, wherein:
the low-frequency signal comprises a signal of 125 KHz; and
the high-frequency signal comprises a signal of 433.92 MHz.

13. The system of claim 8, wherein the vehicle body control device is configured to store authentication information of the smart key in advance in a learning manner and to proceed with authentication for the smart key.

14. The system of claim 8, wherein:
the low-frequency antenna is installed in a door handle portion at a driver's side of the vehicle; and
the welcome speaker is installed in a side mirror portion at the driver's side of the vehicle.

15. A vehicle operable using a smart key, the vehicle comprising:
a vehicle body;
a door coupled to a driver's side of the vehicle body, the door comprising a door handle;
a side mirror disposed on the driver's side of the vehicle;
a low-frequency antenna installed in the door handle;
a vehicle body control device;
an AVNT smart connection device; and
a welcome speaker installed in the side mirror and electrically connected with the AVNT smart connection device;
wherein when the vehicle is in a locked state, the low-frequency antenna is configured to emit a low-frequency signal of a first power to search for the smart key in a first search area, and to emit a low-frequency signal of a second power to search for the smart key in a second search area;
wherein the smart key is configured to emit a high-frequency signal to the vehicle body control device in response to receiving the low-frequency signal of the first power or the low-frequency signal of the second power from the low-frequency antenna;
wherein the vehicle body control device is configured to determine that the smart key is in the first search area in response to a first receipt of the high-frequency signal from the smart key, to proceed with authentication for the smart key, to emit a wake-up signal to the AVNT smart connection device, and to control the low-frequency antenna to emit the low-frequency signal of the second power;
wherein in response to a second receipt of the high-frequency signal from the authenticated smart key, the vehicle body control device is configured to determine that the authenticated smart key is in the second search area, to unfold the side mirror, and to emit a welcome sound output signal to the welcome speaker through the AVNT smart connection device;

wherein in response to receiving the wake-up signal from the vehicle body control device, the AVNT smart connection device is configured to execute a booting program; and wherein in response to receiving the welcome sound output signal from the AVNT smart connection device, the welcome speaker is configured to output a welcome sound simultaneously with unfolding the side mirror by the vehicle body control device.

16. The vehicle of claim 15, wherein:

the first search area is an area where a distance between the low-frequency antenna and the smart key is less than or equal to 3 m; and the second search area is an area where the distance between the low-frequency antenna and the smart key is less than or equal to 1.5 m.

17. The vehicle of claim 16, wherein:

the low-frequency signal of the first power covers the first search area; and the low-frequency signal of the second power covers the second search area.

18. The vehicle of claim 17, wherein:

the low-frequency signal comprises a signal of 125 KHz; and the high-frequency signal comprises a signal of 433.92 MHz.

19. The vehicle of claim 15, wherein:

the low-frequency signal comprises a signal of 125 KHz; and the high-frequency signal comprises a signal of 433.92 MHz.

20. The vehicle of claim 15, wherein the vehicle body control device is configured to store authentication information of the smart key in advance in a learning manner and to proceed with authentication for the smart key.

* * * * *